(12) United States Patent
Kim

(10) Patent No.: US 8,223,291 B2
(45) Date of Patent: Jul. 17, 2012

(54) LIQUID CRYSTAL DISPLAY AND METHOD OF ASSEMBLING THE SAME

(75) Inventor: Jung-Ki Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1059 days.

(21) Appl. No.: 12/143,890

(22) Filed: Jun. 23, 2008

(65) Prior Publication Data

US 2009/0135329 A1 May 28, 2009

(30) Foreign Application Priority Data

Nov. 26, 2007 (KR) .................. 10-2007-0120984

(51) Int. Cl.
*G02F 1/1335* (2006.01)
(52) U.S. Cl. .......... 349/58; 349/149; 349/150; 349/151; 349/152
(58) Field of Classification Search .............. 349/58–60, 349/149–152
See application file for complete search history.

(56) References Cited

U.S. PATENT DOCUMENTS

| 7,209,195 B2* | 4/2007 | Lin ................................ 349/58 |
| 7,433,178 B2* | 10/2008 | Bang et al. ............... 361/679.27 |
| 2004/0141102 A1* | 7/2004 | Lin ................................ 349/58 |
| 2006/0120543 A1* | 6/2006 | Kobayashi et al. ........... 381/152 |

* cited by examiner

*Primary Examiner* — Phu Vu
(74) *Attorney, Agent, or Firm* — F. Chau & Associates, LLC

(57) ABSTRACT

A liquid crystal display (LCD) which can prevent electronic elements from being short-circuited due to a detachment of a printed circuit board (PCB). The LCD includes a liquid crystal panel which displays an image, a first container which is disposed below the liquid crystal panel and includes one or more first protrusions that are formed on an outer surface of a sidewall of the first container, a printed circuit board (PCB) which is electrically connected to the liquid crystal panel via a plurality of connection elements, wherein the PCB is held to the sidewall of the first container, and includes one or more coupling holes that respectively correspond to and receive the first protrusions. The LCD includes a second container which covers the periphery of the liquid crystal panel, the first container and the PCB and the second container includes one or more second protrusions that are formed on a sidewall of the second container and respectively correspond to the first protrusions.

20 Claims, 9 Drawing Sheets

LIQUID CRYSTAL DISPLAY AND METHOD OF ASSEMBLING THE SAME

CROSS-REFERENCE TO RELATED APPLICATION

This application claims priority from Korean Patent Application No. 10-2007-0120984 filed on Nov. 26, 2007 in the Korean Intellectual Property Office, the disclosure of which is incorporated herein by reference in its entirety.

BACKGROUND OF THE INVENTION

1. Technical Field

The present invention relates to a liquid crystal display (LCD) and a method of assembling the same, and, more particularly, to an LCD and a method of assembling the same which can prevent electronic elements from being short-circuited due to a detachment of a printed circuit board (PCB).

2. Discussion of the Related Art

Liquid crystal displays (LCDs) include a liquid crystal panel which has two display panels and a liquid crystal layer interposed between the two display panels. LCDs display images using variations in the optical properties of liquid crystal molecules.

In an LCD, a printed circuit board (PCB) is electrically connected to a liquid crystal panel by a plurality of tape carrier packages (TCPs), and, thus, electric signals generated by the PCB, e.g., a driving signal and a control signal for the liquid crystal panel, can be provided to the liquid crystal panel via the TCPs.

Due to an increase in the size of LCDs, an increasing number of LCDs have been designed to include a plurality of PCBs.

For example, an LCD may include a liquid crystal panel, a first PCB which is electrically connected to the liquid crystal panel via a plurality of TCPs, and a second PCB which is electrically connected to the first PCB.

The first PCB may be coupled to a sidewall of a container, e.g., a mold frame, in order to conserve space. The first PCB may be shielded by a top chassis, which is also coupled to the mold frame.

However, the first PCB may be easily detached from the mold frame due to external shock applied thereto during the transportation or the inspection of the LCD, thereby causing defects in the LCD.

SUMMARY OF THE INVENTION

Embodiments of the present invention provide a liquid crystal display (LCD) which can prevent a printed circuit board (PCB) from being detached from a mold frame, and a method of assembling the LCD.

According to an aspect of the present invention, an LCD includes a liquid crystal panel which displays an image; a first container which is disposed below the liquid crystal panel and includes one or more first protrusions that are formed on an outer surface of a sidewall of the first container; and a printed circuit board (PCB) which is electrically connected to the liquid crystal panel via a plurality of connection elements, is held to the sidewall of the first container. The PCB includes one or more coupling holes that respectively correspond to and receive the first protrusions. The LCD includes a second container which covers the periphery of the liquid crystal panel, the first container and the PCB and includes one or more second protrusions that are formed on a sidewall of the second container and respectively correspond to the first protrusions.

According to another aspect of the present invention, an LCD includes a liquid crystal panel which displays an image; a first container which is disposed below the liquid crystal panel; and a PCB which is electrically connected to the liquid crystal panel via a plurality of connection elements, is held to the sidewall of the first container, and includes one or more coupling holes. A supporting element is formed on an outer surface of the sidewall of the first container and includes one or more first protrusions that respectively correspond to the coupling holes. A second container covers the periphery of the liquid crystal panel, the first container and the PCB and includes one or more second protrusions that respectively correspond to the first protrusions.

According to another aspect of the present invention, a method of assembling an LCD includes preparing a liquid crystal panel, and a first container disposed below the liquid crystal panel, wherein the first container comprises one or more first protrusions formed on an outer surface of a sidewall of the first container; electrically connecting a PCB to the liquid crystal panel; inserting the first protrusions into respective coupling holes formed in the PCB to hold the PCB to the sidewall of the first container; receiving the liquid crystal panel, the first container and the PCB in a second container, wherein the second container comprises one or more second protrusions formed on a sidewall of the second container and respectively corresponding to the first protrusions; and coupling the second container to the liquid crystal panel so that the second protrusions face the respective first protrusions and the respective coupling holes.

BRIEF DESCRIPTION OF THE DRAWINGS

The above and other features of the present invention will become apparent by describing in detail exemplary embodiments thereof with reference to the attached drawings in which.

DETAILED DESCRIPTION OF EMBODIMENTS OF THE INVENTION

Figure 1A:
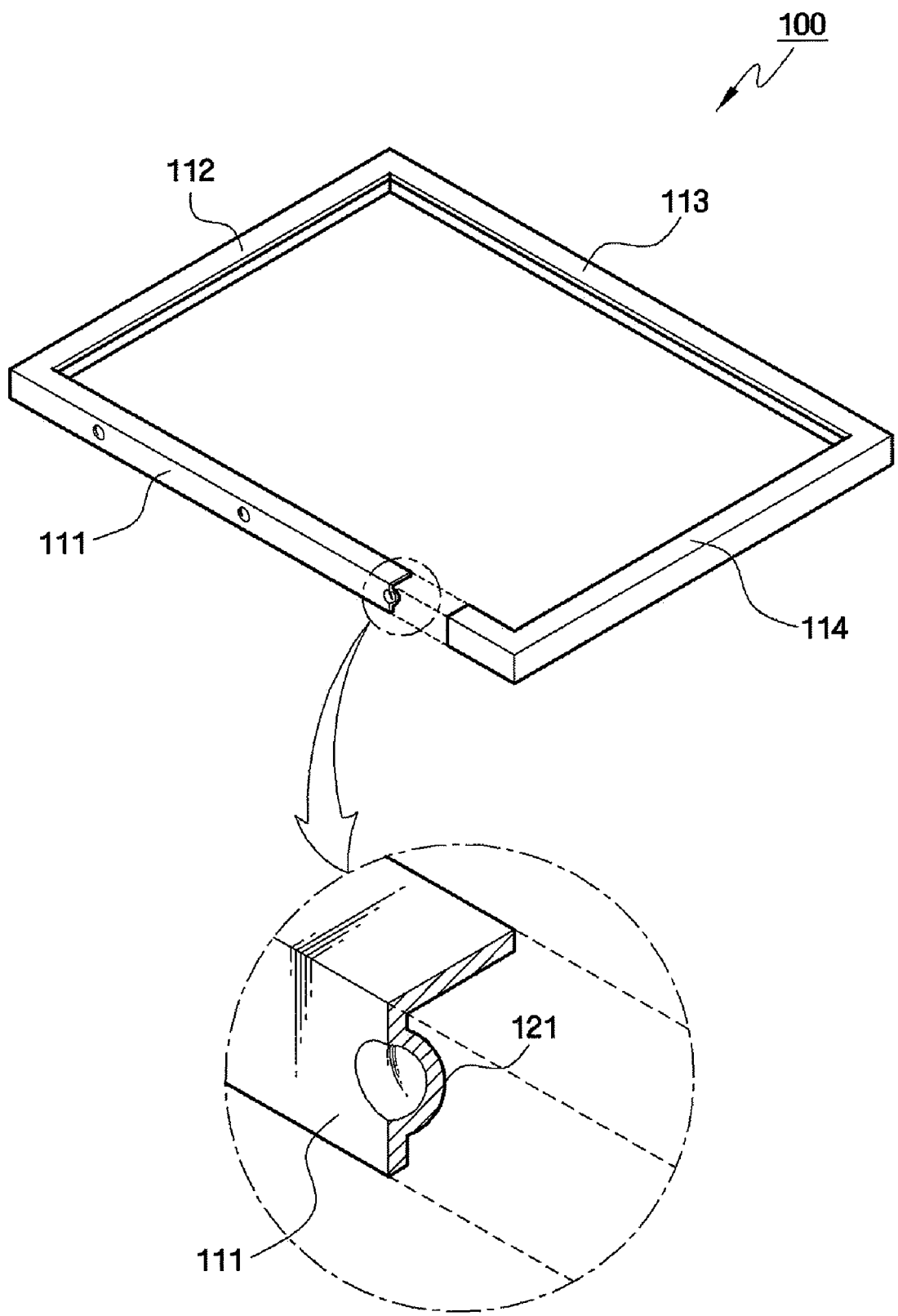
FIG. 1A illustrates a partially exploded perspective view of an upper container of a liquid crystal display (LCD), according to an embodiment of the present invention.

Embodiments of the present invention will now be described more fully with reference to the accompanying drawings, in which exemplary embodiments of the invention are shown. The invention may, however, be embodied in many different forms and should not be construed as being limited to the embodiments set forth herein. In the drawings, like reference numerals may indicate like elements.

Figure 1B:
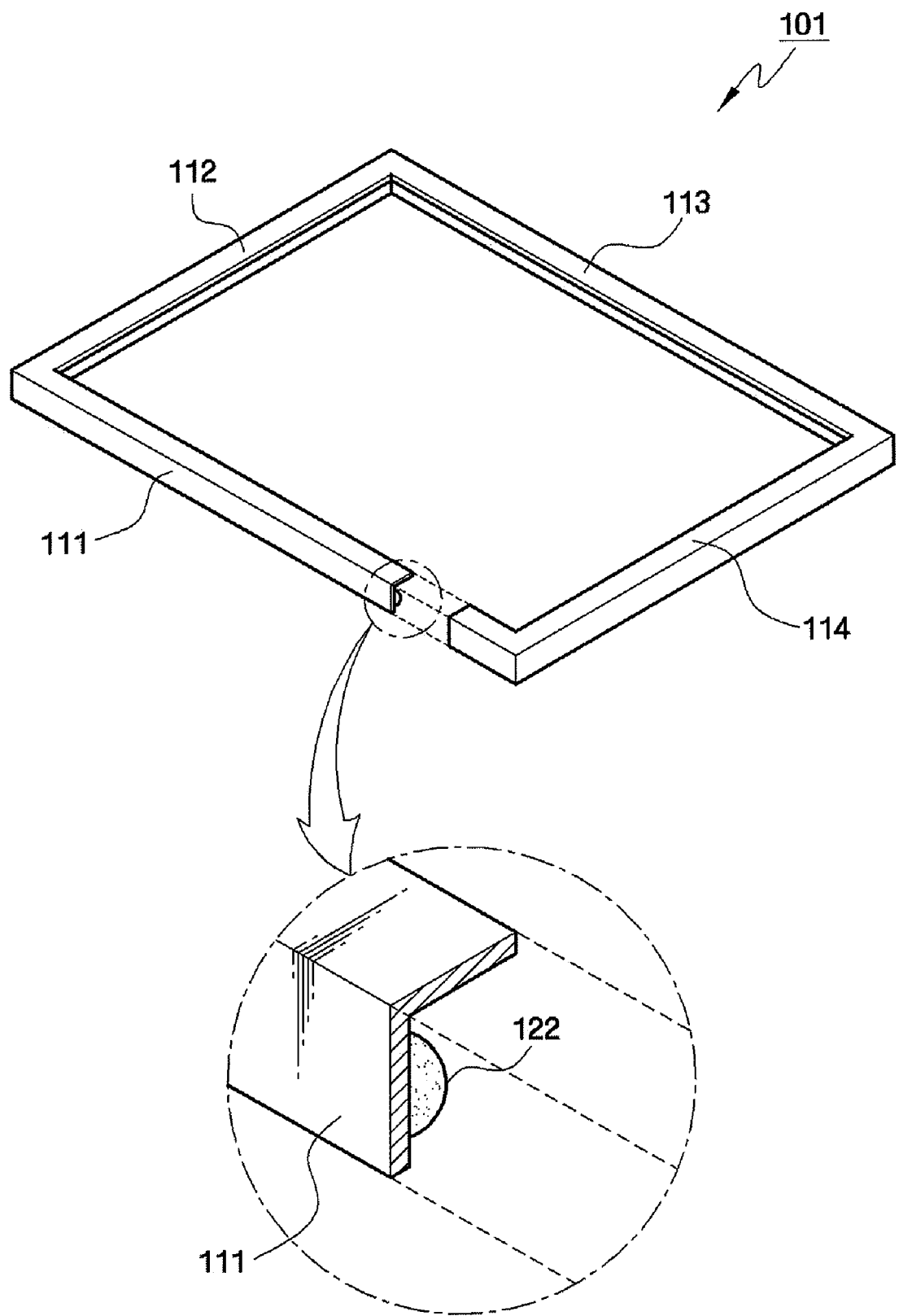
FIG. 1B illustrates a partially exploded perspective view of an upper container of an LCD, according to an embodiment of the present invention.

FIG. 1A illustrates a partially exploded perspective view of an upper container 100 of a liquid crystal display (LCD) according to an embodiment of the present invention, and FIG. 1B illustrates a partially exploded perspective view of an upper container 101 of an LCD according to another embodiment of the present invention.

Referring to FIGS. 1A and 1B, the upper container 100 or 101 may include a plurality of sidewalls 111, 112, 113 and 114. The upper container 100 or 101 may be formed as a rectangular frame having an opening. The upper container 100 or 101 may be coupled to the liquid crystal panel 210 (refer to FIG. 2A) and/or a mold frame 300 (refer to FIG. 2A) and expose a display region of a liquid crystal panel.

Figure 3:
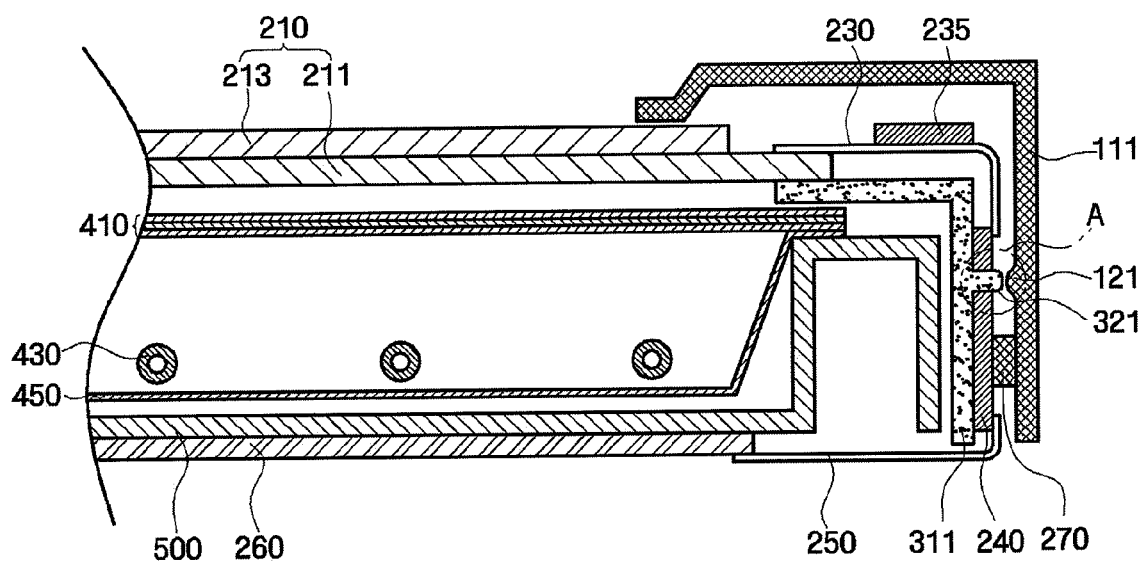
FIG. 3 illustrates a cross-sectional view taken along line III-III' of FIG. 2A according to an embodiment of the present invention.

Each of the sidewalls 111, 112, 113 and 114 of the upper container 100 or 101 may be bent and may thus be L-shaped. Referring, for example, to FIG. 3, first surfaces of the sidewalls 111, 112, 113 and 114 may contact the liquid crystal panel 210, and second surfaces of the sidewalls 111, 112, 113 and 114, which extend substantially perpendicularly from the respective first surfaces of the sidewalls 111, 112, 113 and 114, may contact the mold frame 300.

At least one of the sidewalls 111, 112, 113, and 114 of the upper container 100 or 101, for example, the sidewall 111, may include a plurality of protrusions 121 or 122. The protrusions 121 or 122 may be formed on an inner surface of the sidewall 111.

The protrusions 121 may be formed of substantially the same material as the upper container 100. For example, the protrusions 121 may be formed of a metal. Referring to FIG. 1A, the protrusions 121 are disposed on an inner surface of the sidewall 111 of the container 100. The protrusions 121 may be formed by pressurizing the outer surface of the sidewall 111. For example, pressure may be applied to the outer surface of the sidewall 111 using equipment such as a press so that the protrusions 121 can be formed on the inner surface of the sidewall 111 as embossed patterns and can protrude inwardly from the inner surface of the sidewall 111.

The upper container 100 may be formed of a metal, for example, aluminium (Al) or an aluminium alloy. The protrusions 121 may be formed of the same material as the upper container 100.

The protrusions 122 may be formed of a different material from that of the upper container 101. For example, if the upper container 100 is formed of a metal such as aluminium or an aluminium alloy, the protrusions 121 may be formed of a material other than aluminium or an aluminium alloy. Specifically, referring to FIG. 1B, the protrusions 122 are formed on an inner surface of the sidewall 111 of the upper container 101. The protrusions 122 may be formed of a different material from that of the upper container 101. That is, the upper container 101 may be formed of a metal such as aluminium or an aluminium alloy, and the protrusions 122 may be formed of a different material than that of the upper container 101, for example, an insulating material. The protrusions 122 may be formed by depositing an insulating material on an inner surface of the sidewall 111 of the upper container 101.

The upper container 100 or 101 may be coupled to the liquid crystal panel 210. The protrusions 121 and 122 of the upper container 100 or 101 may respectively correspond to a plurality of protrusions 321 (refer, for example, to FIGS. 2A-2C) of the mold frame 300.

LCDs according to embodiments of the present invention will hereinafter be described in detail with reference to FIGS. 2A through 6. The LCDs of the embodiments of FIGS. 2A through 6 include the upper container 100 illustrated in FIG. 1A. However, the embodiments of the present invention are not limited thereto, and may include the upper container 101 illustrated in FIG. 1B.

Figure 2A:
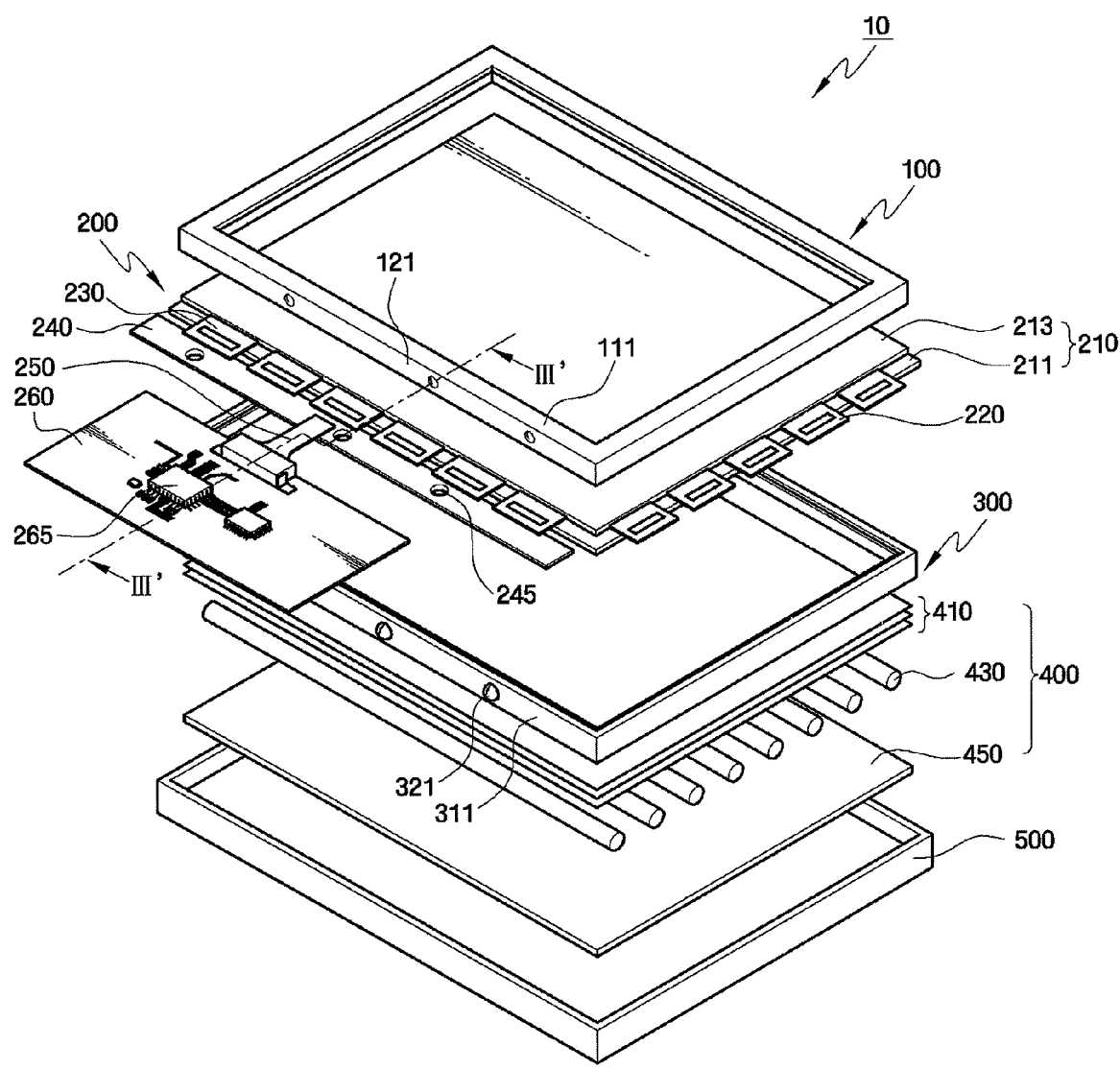
FIG. 2A illustrates an exploded perspective view of an LCD according to an embodiment of the present invention.
Figure 2B:
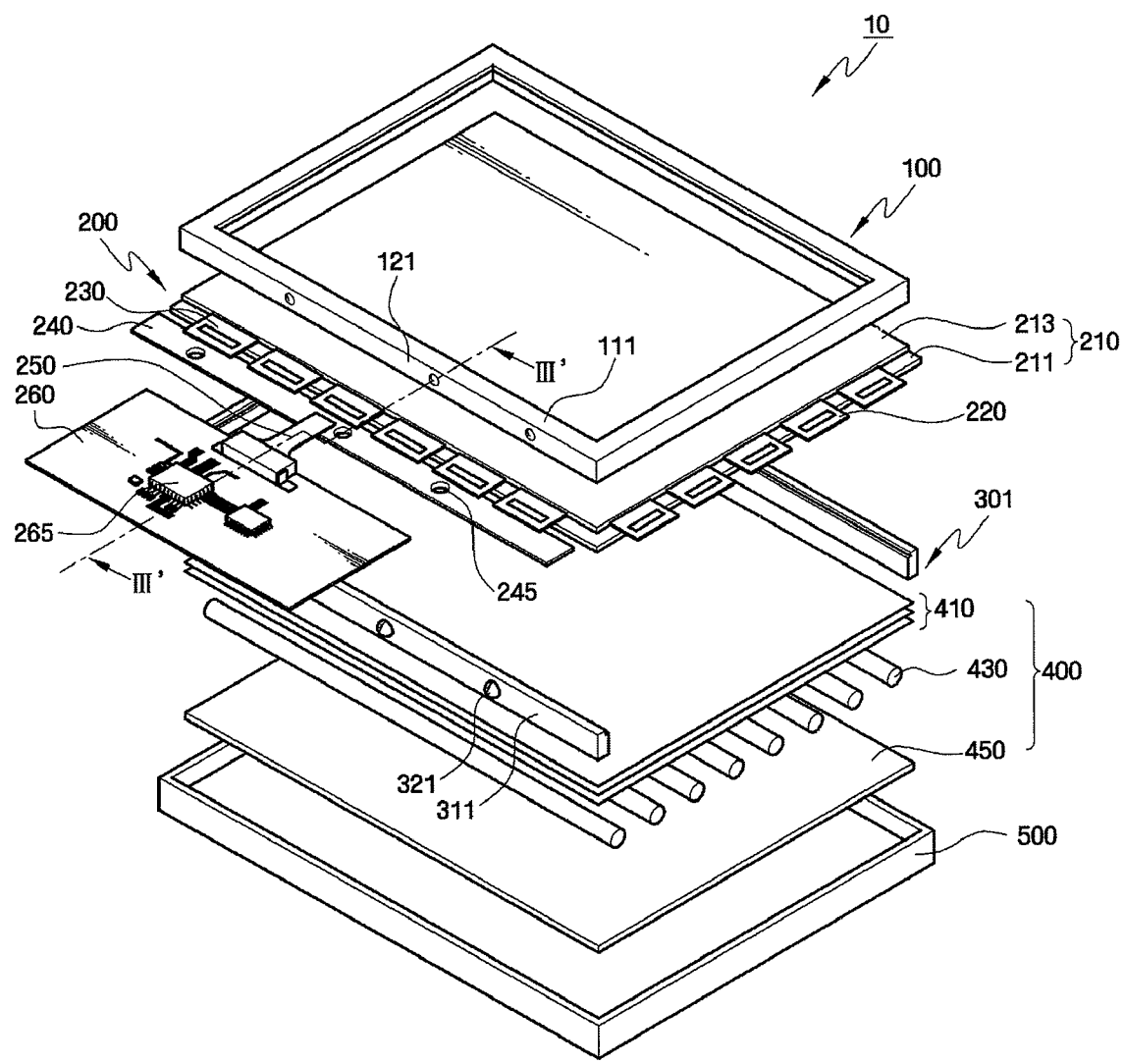
FIG. 2B illustrates an exploded perspective view of an LCD according to an embodiment of the present invention.
Figure 2C:
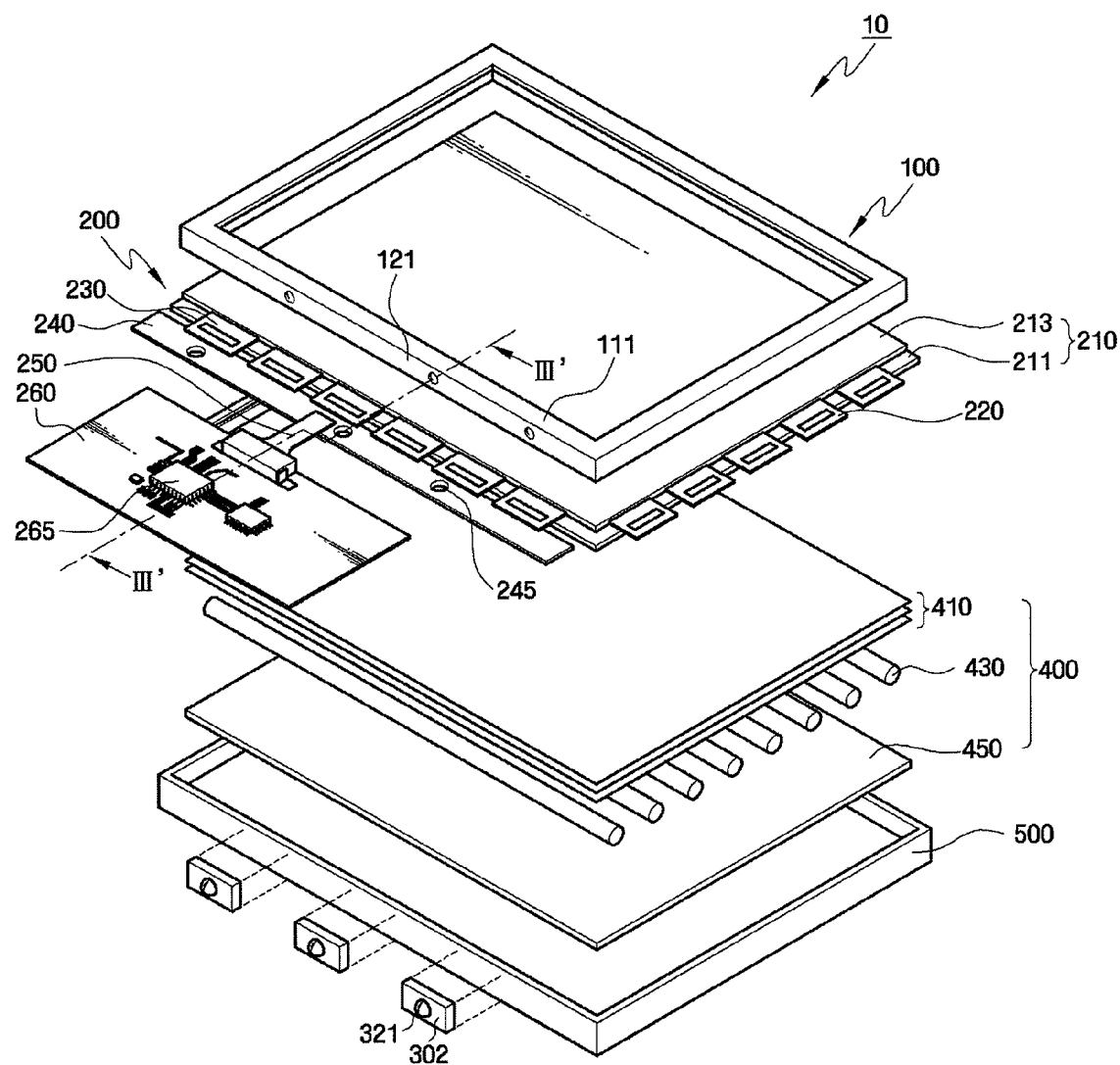
FIG. 2C illustrates an exploded perspective view of an LCD according to an embodiment of the present invention.
Figure 4:
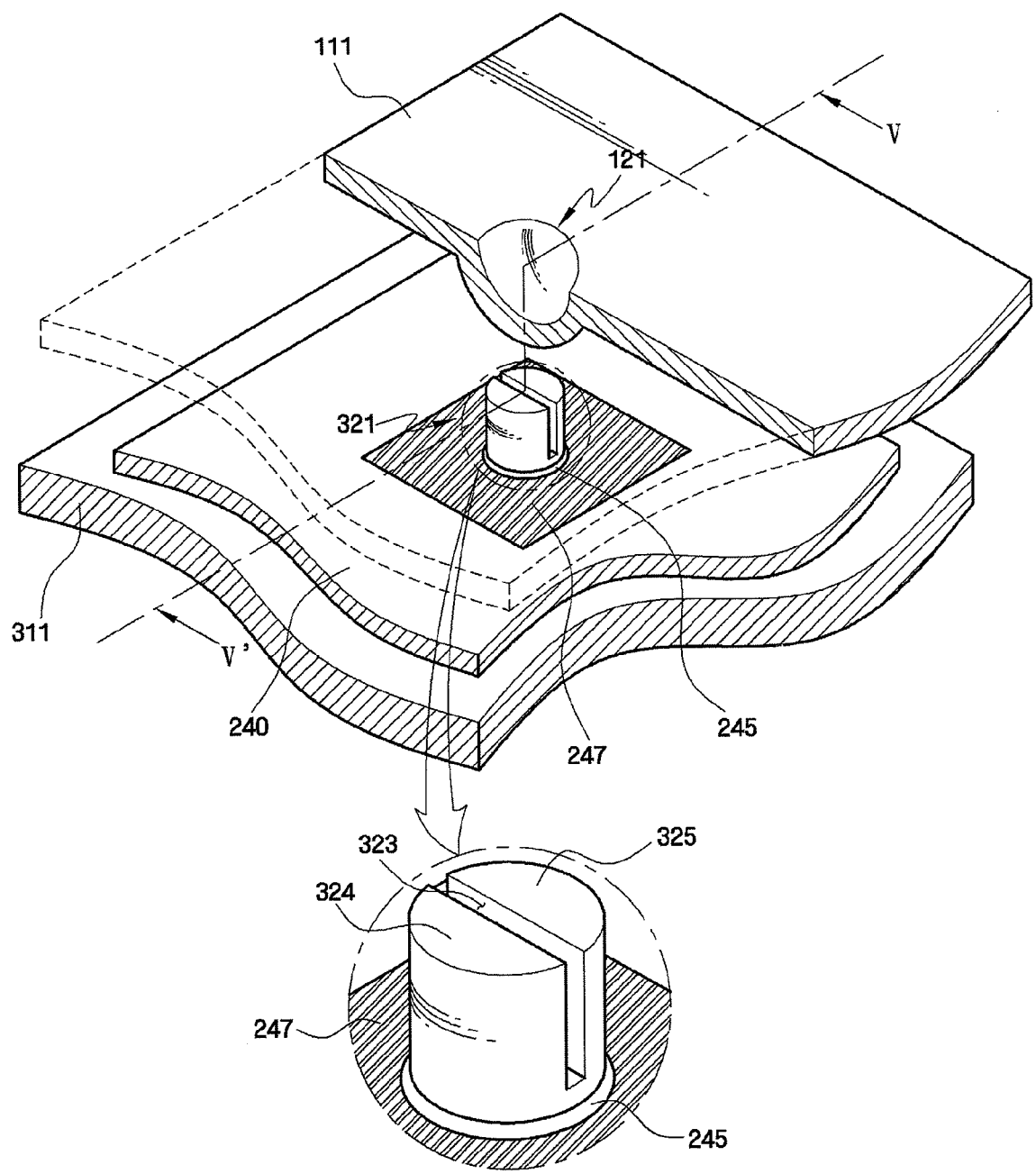
FIG. 4 illustrates an enlarged perspective view of of portion A of FIG. 3 according to an embodiment of the present invention.
Figure 5:
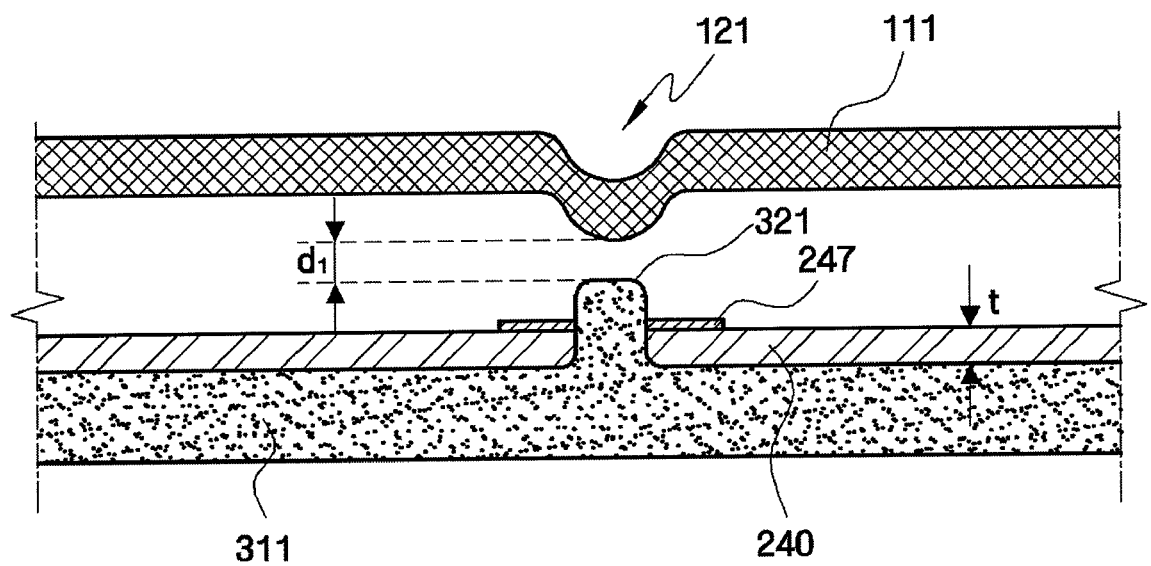
FIG. 5 illustrates a cross-sectional view taken along line V-V' of FIG. 4 according to an embodiment of the present invention.
Figure 6:
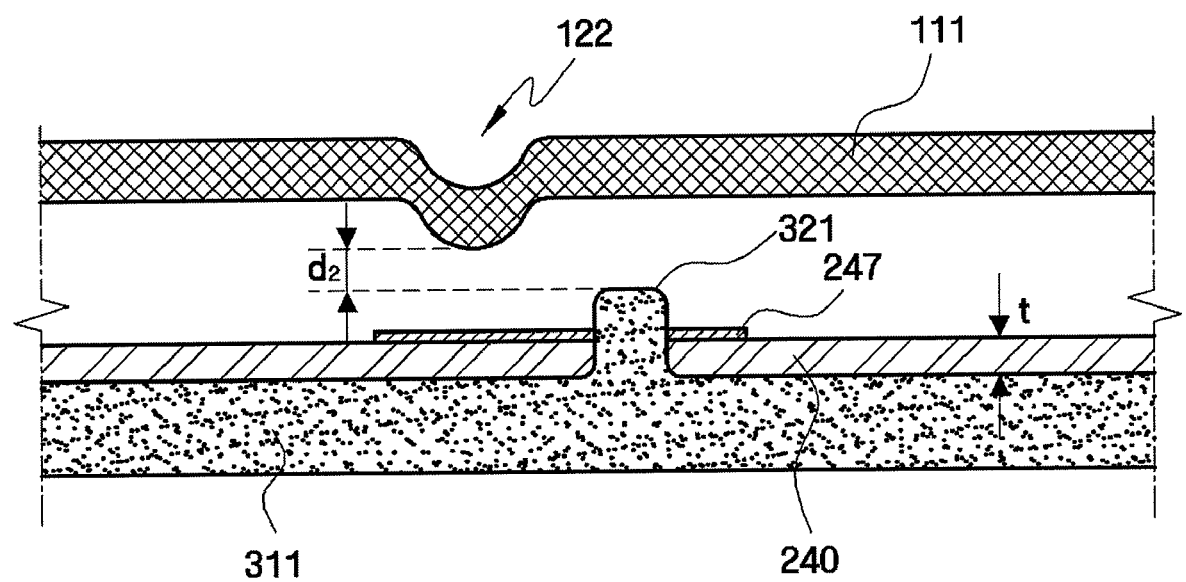
FIG. 6 illustrates a cross-sectional view taken along line V-V' of FIG. 4 according to an embodiment of the present invention.
Figure 7:
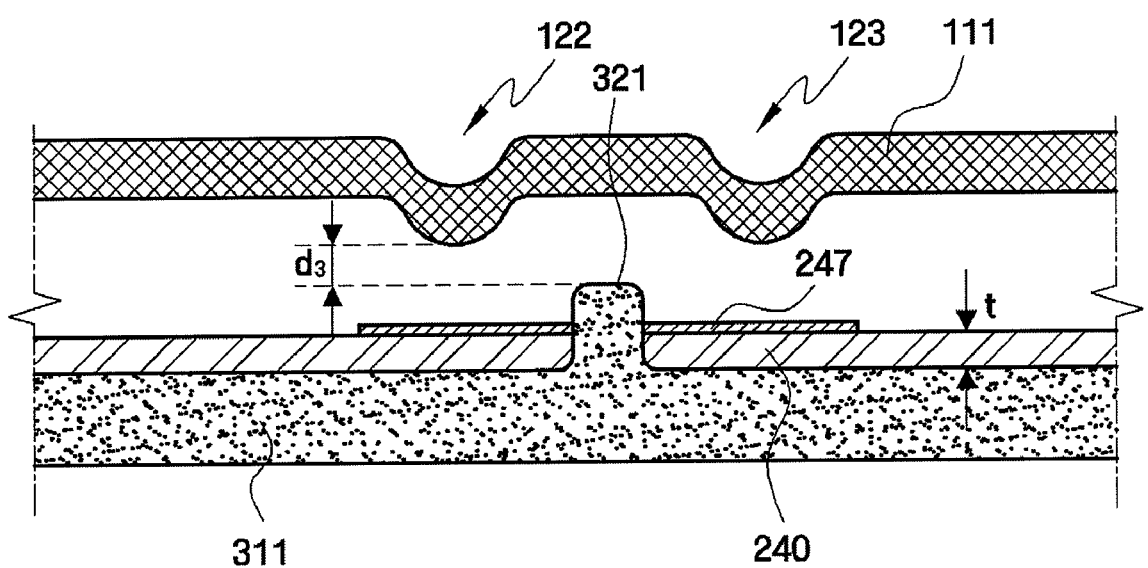
FIG. 7 illustrates a cross-sectional view taken along line V-V' of FIG. 4 according to an embodiment of the present invention.

FIG. 2A illustrates an exploded perspective view of an LCD 10 according to an embodiment of the present invention, FIG. 2B illustrates an exploded perspective view of an LCD 10 according to another embodiment of the present invention, and FIG. 2C illustrates an exploded perspective view of an LCD 10 according to another embodiment of the present invention. FIG. 3 illustrates a cross-sectional view taken along line III-III' of FIG. 2A. FIG. 4 illustrates an enlarged perspective view of portion A of FIG. 3, according to an embodiment of the present invention. FIG. 5 illustrates a cross-sectional view taken along line V-V' of FIG. 4, according to an embodiment of the present invention. FIG. 6 illustrates a cross-sectional view taken along line V-V' of FIG. 4, according to an other embodiment of the present invention, and FIG. 7 illustrates a cross-sectional view taken along line V-V' of FIG. 4, according to another embodiment of the present invention.

Referring to FIGS. 2A and 3, the LCD 10 includes a liquid crystal panel assembly 200, a mold frame 300, a backlight assembly 400, an upper container 100 and a lower container 500.

The liquid crystal panel assembly 200 includes a liquid crystal panel 210 which displays an image, a plurality of tape carrier packages (TCPs) 220 and 230, which are electrically connected to the liquid crystal panel 210, and a first printed circuit board (PCB) 240 connected to the TCP 220, and a second PCB 260 connected to the first PCB 240. First and second PCBs 240 and 260 may be electrically connected to TCPs 220 and 230, respectively, and provide driving and control signals to the liquid crystal panel 210.

The liquid crystal panel 210 displays an image and includes a first display panel 211, a second display panel 213 and a liquid crystal layer (not shown) which is interposed between the first display panel 211 and the second display panel 213.

A plurality of gate lines (not shown), a plurality of data lines (not shown), a plurality of pixel electrodes (not shown), and a plurality of thin film transistors (TFTs) (not shown) are formed on the first display panel 211. The gate lines are spaced at regular intervals and extend in a first direction. The data lines extend in a second direction and intersect the gate lines. The data lines are also spaced at regular intervals. The pixel electrodes are defined in respective corresponding pixel regions by the gate lines and the data lines and are arranged in a matrix. The TFTs are switched on or off by signals of the gate lines and transmit signals of the data lines to the pixel electrodes.

A plurality of light shield patterns (not shown) for shielding areas on the second display panel 210 except the pixel regions from light, a plurality of red (R), green (G), and blue (B) color filter patterns (not shown) for realizing colors, and a plurality of common electrodes (not shown) for realizing images are formed on the second display panel 213.

The first and second display panels 211 and 213 are a predetermined distance apart from each other, which is maintained by spacers, and a liquid crystal layer (not shown) including a plurality of liquid crystal molecules is interposed between the first and second display panels 211 and 213.

The TCPs 220 are arranged on one side of the liquid crystal panel 210, and the TCPs 230 are arranged on another side of the liquid crystal panel 210. The TCPs 220, 230 may include gate TCPs 220, and data TCPs 230.

The gate TCPs 220 are connected to the gate lines of the first display panel 211 and provide a driving signal and a control signal to the gate lines. The data TCPs 230 are connected to the data lines of the first display panel 211 and provide a driving signal and a control signal to the data lines. A plurality of chips, e.g., driving chips 235 of the liquid crystal panel 210, may be respectively attached to central portions of the gate TCPs 220 and the data TCPs 230.

The first PCB 240 is electrically connected to the liquid crystal panel 210 via a plurality of connection elements, e.g., the data TCPs 230. A plurality of electronic elements (not shown) may be mounted on the liquid crystal panel 210. A driving signal and a control signal for the liquid crystal panel 210 may be provided to the liquid crystal panel 210 via the data TCPs 230.

The first PCB 240 may be coupled and fixed to a sidewall 311 of the mold frame 300. That is, a plurality of first protrusions 321 are formed on the sidewall 311 of the mold frame 300 and protrude beyond the sidewall 311. The first PCB 240 may include a plurality of coupling holes 245 which respectively correspond to and receive the first protrusions 321. The first PCB 240 may be bent toward the sidewall 311 of the mold frame 300, and the first protrusions 321 may be respectively inserted into and coupled to the coupling holes 245 of the first PCB 240 so that the first PCB can be coupled and fixed to the sidewall 311 of the mold frame 300.

The second PCB 260 is electrically connected to the first PCB 240 via a connection element, e.g., a flexible printed circuit film (FPC) 250. A plurality of electronic elements 265 may be mounted on the second PCB 260 and generate a driving signal and a control signal for the liquid crystal panel 210. The driving signal and the control signal may be provided to the first PCB 240 via the FPC 250 and then provided to the liquid crystal panel 210 through the data TCPs 230 which are connected to the first PCB 240.

The second PCB 260 may be coupled and fixed to the bottom surface of the lower container 500. That is, the second PCB 260, which is connected to the first PCB 240 via the FPC 250, may be bent along the sidewall 311 of the mold frame 300 to which the first PCB 240 is coupled and fixed. Thus, the second PCB 260 may be coupled and fixed to the bottom surface of the lower container 500. The second PCB 260 may be coupled to and fixed to the bottom surface of the lower container 500 by screws, but the embodiments of the present invention are not restricted to this.

The mold frame 300 includes a plurality of sidewalls and can hold and support the liquid crystal panel 210. The first PCB 240 may be coupled and fixed to the sidewall 311 of the mold frame 300. The mold frame 300 may be formed of an insulating material, for example, resin. The mold frame 300 may be coupled to the upper container 100 and/or the lower container 500.

The mold frame 300 may include at least one sidewall or a pair of sidewalls that face each other. Referring to FIG. 2B, a mold frame 301 may include a pair of sidewalls that can hold and support a pair of longitudinal lateral sides of the liquid crystal panel 210. However, the embodiments of the present invention are not restricted to this. For example, the mold frame 301 may include a pair of sidewalls that can hold and support a pair of latitudinal lateral sides of the liquid crystal panel 210 or only one sidewall that can hold and support only one of the longitudinal and latitudinal lateral sides of the liquid crystal panel 210.

Referring to FIG. 2C, the LCD 100 has no mold frame between an upper container 100 and a lower container 500. Instead, the LCD 100 includes a plurality of supporting elements 302 which are disposed on one side of the lower container 500. Each of the supporting elements 302 includes a first protrusion 321. That is, if the upper container 100 and the lower container 500 are sufficient to hold and support a liquid crystal panel 210, the LCD 10 may not include any additional mold frame. Instead, the supporting elements 302, including the first protrusions 321, may be provided on a lateral surface of the lower container 500. The supporting elements 302 may be arranged on a lateral surface of the container 500 near a first PCB 240. The supporting elements 302 may be arranged only in places where they are needed, thereby providing an efficient configuration.

The number of supporting elements 302 may be altered according to the size of the first PCB 240, and more than one first protrusion 321 may be provided to each of the supporting elements 302. If the LCD 10 includes a mold frame, the supporting elements 302 may be arranged on one side of the mold frame.

Referring to FIGS. 2A and 2B, the first protrusions 321, which are formed on the sidewall 311 of the mold frame 300 or 301 in the vicinity of the first PCB 240, may be formed of substantially the same material as the sidewall 311 of the mold frame 300 or 301 and may be incorporated with the sidewall 311 of the mold frame 300 or 301.

Referring to FIG. 4, a first protrusion 321 is formed on a sidewall 311 of the mold frame 300 of FIG. 2A. The first protrusion 321 may be formed, for example, as a circular column or a polygonal column such as a rectangular column. The first protrusion 321 is illustrated in FIG. 4 as being cylindrical, but the embodiments of the present invention are not restricted to this.

A cutout portion 323 having a predetermined width may be formed in the first protrusion 321 and extend across the center of the first protrusion 321. The first protrusion 321 may be divided into a pair of columns, e.g., a pair of semicircular columns 324 and 325, by the cutout portion 323. Due to the cutout portion 323, the first protrusion 321 may have as much elasticity as the width of the cutout portion 323. The semicircular columns 324 and 325 face each other and have substantially the same height.

A coupling hole 245 is formed on a first PCB 240 which is coupled to the sidewall 311. The width of the coupling hole 245 may be determined to be substantially the same as or less than the width of the first protrusion 321 in order to effectively couple the first PCB 240 and the mold frame 300 with the aid of the elasticity of the first protrusion 321.

For example, if the width of the coupling hole 245 is greater than the width of the first protrusion 321, the first PCB 240 may be easily detached from the sidewall 311 of the mold frame 300, and then placed in contact with the upper container 100, thereby causing defects such as a short circuit between electronic elements on the first PCB 240.

If the width of the coupling hole 245 is less than the width of the first protrusion 321, the first PCB 240 may be prevented from being easily detached from the sidewall 311 of the mold frame 300. Specifically, if the diameter of the coupling hole 245 is less than the diameter of the first protrusion 321, the first protrusion 321 may need to be contracted to fit in the coupling hole 245. That is, the semicircular columns 324 and 325 of the first protrusion 321 may need to be bent toward the center of the first protrusion 321 to fit in the coupling hole 245. If the semicircular columns 324 and 325 are bent toward the center of the first protrusion 321, the width of the first protrusion 321 may become less than the width of the coupling hole 245, and thus, the first protrusion 321 may be able to be inserted into the coupling hole 245. Once the first protrusion 321 is inserted into the coupling hole 245, the semicircular columns 324 and 325 return to their original positions due to the elasticity of the first protrusion 321. Thus, the first protrusion 321 can be firmly coupled and fixed in the coupling hole 245.

In short, the width of the coupling hole 245 may be substantially the same as or less than the width of the first protrusion 321.

The first protrusion 321 may be exposed to the outside of the first PCB 240 through the coupling hole 245. That is, the height of the first protrusion 321 may be greater than the thickness of the first PCB 240. Thus, when the first protrusion 321 is inserted into the coupling hole 245, the first protrusion 321 protrudes beyond the first PCB 240. The first protrusion 321 may correspond to a second protrusion which is formed on the upper container 100 (described later in detail).

Referring to FIGS. 2A and 3, the backlight assembly 400 is disposed below the liquid crystal panel 210 and the mold frame 300. The backlight assembly 400 includes a plurality of optical sheets 410, a plurality of light source units 430 and a reflection sheet 450.

The optical sheets 410 are disposed over the light source units 430 and are contained in and fixed by the mold frame 300. The optical sheets 410 enable light emitted from the light source units 430 to be uniformly emitted toward the liquid crystal panel 210. The optical sheets 410 may include a stack of one or more diffusion sheets, one or more prism sheets and/or one or more protection sheets The light source units 430 may include a plurality of lamps that are arranged below the liquid crystal panel 210 in a direct-type manner, but the embodiments of the present invention are not restricted to this. That is, the light source units 430 may include a plurality of lamps that are arranged below the liquid crystal panel 210 in an edge-type manner. The light source units 430 may also include a light guide plate (not shown) which scatters light.

The lamps of the light source units 430 may be line light sources such as cold cathode fluorescent lamps (CCFLs) or hot cathode fluorescent lamps (HCFLs). Alternatively, the lamps of the light source units 430 may be point light sources such as light-emitting diodes (LEDs).

The reflection sheet 450 is disposed below the light source units 430. The reflection sheet 450 prevents leakage of light emitted from the light source units 430, and enables the light to be reflected toward the liquid crystal panel 210, thereby improving the luminance of the liquid crystal panel 210. The reflection sheet 450 may be incorporated with the lower container 500.

The above-mentioned elements of the backlight assembly 400 are all contained in the lower container 500. The lower container 500 may be formed as a rectangular frame structure having a space for storage therein. The lower container 500 may be formed of a metal, for example, aluminum or an aluminum alloy. The second PCB 260 may be disposed below and coupled to the bottom surface of the lower container 500.

The lower container 500 may be coupled to the mold frame 300 and/or the upper container 100. Specifically, the lower container 500, the mold frame 300, and the upper container 100 may include a plurality of holes, for example, a plurality of screw coupling holes (not shown). Thus, the lower container 500, the mold frame 300, and the upper container 100 may be coupled to one another by screws, but the embodiments of the present invention are not restricted to this. That is, the lower container 500, the mold frame 300, and the upper container 100 may be coupled to one another using a method other than that involving the use of screws.

The upper container 100 is coupled to the top surface of the liquid crystal panel 210 and exposes a display region of the liquid crystal panel 210. The upper container 100 may be formed of substantially the same material as the lower container 500. For example, the upper container 100 may be formed of a metal, for example, aluminum or an aluminum alloy. The upper container 100 has already been described above with reference to FIG. 1A.

At least one electromagnetic wave shield element, e.g., at least one gasket 270, may be provided between the first PCB 240 and the upper container 100. The gasket 270 reduces electromagnetic waves generated by a plurality of electronic elements on the first PCB 240. The gasket 270 places a ground of the first PCB 240 and the upper container 100 in contact with each other, and thus increases the voltage of the ground of the first PCB 240.

The height of the gasket 270 may be greater than the height of the first and second protrusions 321 and 121 combined. That is, the height of the gasket 270, which is disposed between the first PCB 240 and the upper container 100, may be substantially greater than the sum of the height of the first protrusions 321, which are formed on the mold frame 300, and the height of the second protrusions 121, which are formed on the upper container 100.

Referring to FIGS. 3 through 5, a second protrusion 121 may be formed on the sidewall 111 of the upper container 100 and correspond to the first protrusion 321 on the sidewall 311 of the mold frame 300.

Specifically, the second protrusion 121 may be formed on the sidewall 111 of the upper container 100 and protrude inwardly from the inner surface of the sidewall 111 of the upper container 100. The second protrusion 121 may face a first protrusion on the sidewall 311 of the mold frame 300. That is, the second protrusion 121 and the first protrusion 321 may be aligned with each other with respect to the sidewall 311 of the mold frame 300.

The first protrusion 321 may be incorporated with the sidewall 311 of the mold frame 300. The first protrusion 321 may correspond to and be inserted into a coupling hole 245 on the first PCB 240. The second protrusion 121 may be formed as an embossed pattern by pressurizing the outer surface of the sidewall 111 of the upper container 100. The width of the second protrusion 121 may be substantially the same as or greater than the width of the first protrusion 321.

Referring to FIGS. 4 and 5, the first protrusion 321 and the second protrusion 121 may be a distance d1 apart from each other. That is, the second protrusion 121 may be spaced apart from the top of the first protrusion 321. The distance d1 may be determined according to a thickness t of the first PCB 240. For example, the distance d1 may be about ½ to about ⅔ of the thickness t of the first PCB 240. If the distance d1 is less than the thickness t of the first PCB 240, the first PCB 240 may be prevented from being completely detached from the mold frame 300, thereby preventing a short circuit between the electronic elements on the first PCB 240 and the upper container 100. The thickness t of the first PCB 240 may be about 1-about 2 mm.

The first PCB 240 may include a ground area 247 which corresponds to the second protrusion 121. Specifically, the ground area 247 may be formed on the first PCB 240 and surround the coupling hole 245. The ground area 247 may be electrically connected to the ground of the first PCB 240.

The width of the ground area 247 may be determined to be substantially the same as or greater than the width of the second protrusion 121 in order to prevent a short circuit between the first PCB 240 and the second protrusion 121, which is formed of a metal. That is, even if the first PCB 240 is accidentally detached from the first protrusion 321 of the mold frame 300 due to external shock and is placed in contact with the second protrusion 121, it is possible to prevent a short circuit between the second protrusion 121 and the first PCB 240 due to the ground area 247. In the embodiment of FIG. 5, the ground area 247 is formed on the first PCB 240 in order to prevent a short circuit between the first PCB 240 and the upper container 100. However, the embodiments of the present invention are not restricted to this. That is, an insulating material such as a dielectric tape may be attached between the first PCB 240 and the second protrusion 121

According to an embodiment of the present invention, the first protrusion 321 and the second protrusion 121 are not be vertically aligned with each other, as illustrated in FIGS. 6 and 7. Specifically, referring to FIG. 6, a second protrusion 122 is disposed on one side of an imaginary vertical line that extends from a first protrusion 321, i.e., an imaginary straight line that is perpendicular to a sidewall 311. Referring to FIG. 7, a pair of protrusions 122 and 123 is provided for a first protrusion 321 and the protrusions 122 and 123 are respectively disposed on both sides of an imaginary vertical line that extends from the first protrusion 321, i.e., an imaginary straight line that is perpendicular to a sidewall 311.

Referring to FIGS. 6 and 7, the first protrusion 321 may be a distance d2 or d3 apart from the protrusions 122 and 123. The distance d2 or d3 may be about ½ to about ⅔ of a thickness of a first PCB 240. The thickness t of the first PCB 240 may be about 1-about 2 mm.

Referring to FIGS. 6 and 7, a ground area 247 may be formed on the first PCB 240 and correspond to the protrusions 122 and 123. The width of the ground area 247 may be substantially the same as or greater than the width of the protrusions 122 and 123.

Referring to FIG. 6, the ground area 247 may be asymmetrical with respect to a coupling hole 245 and may thus be able to cover the protrusion 122 and/or 123 which is not vertically aligned with the first protrusion 321.

An insulating material (e.g., an insulating tape), instead of the ground area 247, may be provided between the first PCB 240 and the second protrusions 122 and 123.

The embodiments of the present invention have been described above, taking an LCD as an example. However, the embodiments of the present invention are not restricted to an LCD. That is, the embodiments of the present invention can be applied to various types of display devices such as a plasma display panel (PDP) and an organic LED (OLED).

As described above, according to embodiments of the present invention, it is possible to prevent a PCB from being detached from a mold frame by using a plurality of protrusions. Therefore, it is possible to prevent electronic elements on a PCB from being short-circuited due to a detachment of the PCB.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A liquid crystal display (LCD) comprising:
a liquid crystal panel;
a first container disposed below the liquid crystal panel and comprising one or more first protrusions formed on an outer surface of a sidewall of the first container;
a printed circuit board (PCB) electrically connected to the liquid crystal panel, wherein the PCB comprises one or more coupling holes that respectively correspond to and receive the first protrusions through the coupling holes; and
a second container covering the periphery of the liquid crystal panel, the first container and the PCB, wherein the second container comprises one or more second protrusions formed on a sidewall of the second container and respectively corresponding to the first protrusions.

2. The LCD of claim 1, wherein the first protrusions are aligned with the respective second protrusions.

3. The LCD of claim 1, wherein the first protrusions are not aligned with the respective second protrusions.

4. The LCD of claim 1, wherein the first protrusions are a predetermined distance apart from the respective second protrusions.

5. The LCD of claim 4, wherein the predetermined distance is about ½ to about ⅔ of a thickness of the PCB.

6. The LCD of claim 1, wherein the second protrusions are formed of substantially the same material as the second container.

7. The LCD of claim 6, wherein the second protrusions are formed as embossed patterns that protrude inwardly from an inner surface of the sidewall of the second container by pressuring an outer surface of the sidewall of the second container.

8. The LCD of claim 1, wherein the second protrusions are formed of an insulating material and are attached on an inner surface of the second container.

9. The LCD of claim 1, wherein the PCB further comprises one or more ground areas which respectively surround the coupling holes, the ground areas having a width that is substantially the same as or greater than the width of the second protrusions.

10. The LCD of claim 1, wherein a width of the coupling holes is substantially the same as or less than the width of the first protrusions.

11. The LCD of claim 1, wherein a diameter of the second protrusions is substantially the same as or greater than the diameter of the first protrusions.

12. The LCD of claim 1, further comprising one or more gaskets disposed between the PCB and the second container, wherein the gaskets reduce electromagnetic waves generated by the PCB.

13. The LCD of claim 12, wherein a height of the gaskets is greater than a sum of the height of a first protrusion and the height of a second protrusion.

14. The LCD of claim 1, wherein the PCB is electrically connected to the liquid crystal panel via a plurality of connection elements, and the connection elements comprise tape carrier packages (TCPs).

15. The LCD of claim 1, further comprising: a backlight assembly disposed below the liquid crystal panel; and a third container receiving the backlight assembly therein, wherein the third container is coupled to the first and second containers.

16. The LCD of claim 15, wherein the third container is coupled to the first and second containers by screws.

17. The LCD of claim 15, further comprising a second PCB disposed on a bottom surface of the third container and, wherein the second PCB is electrically connected to the PCB.

18. The LCD of claim 17, wherein the second PCB is electrically connected to the PCB via a flexible printed circuit film (FPC).

19. An LCD comprising:
a liquid crystal panel;
a first container disposed below the liquid crystal panel;
a PCB electrically connected to the liquid crystal panel, wherein the PCB is held to a sidewall of the first container, and comprises one or more coupling holes;
a supporting element formed on an outer surface of the sidewall of the first container, wherein the supporting element comprises one or more first protrusions that respectively correspond to the coupling holes, the coupling holes receiving respective corresponding first protrusions through the coupling holes; and
a second container covering the periphery of the liquid crystal panel, the first container and the PCB, wherein the second container comprises one or more second protrusions respectively corresponding to the first protrusions.

20. A method of assembling an LCD, the method comprising:
preparing a liquid crystal panel, and
a first container disposed below the liquid crystal panel, wherein the first container comprises one or more first protrusions formed on an outer surface of a sidewall of the first container;
electrically connecting a PCB to the liquid crystal panel;
inserting the first protrusions into respective coupling holes formed in the PCB to hold the PCB to the sidewall of the first container;
receiving the liquid crystal panel, the first container and the PCB in a second container, wherein the second container comprises one or more second protrusions formed on a sidewall of the second container and respectively corresponding to the first protrusions; and
coupling the second container to the liquid crystal panel so that the second protrusions face the respective first protrusions and the respective coupling holes.

* * * * *